April 18, 1933.　　J. W. WOOD, JR　　1,903,847
AIRPORT CONSTRUCTION
Filed Aug. 30, 1930
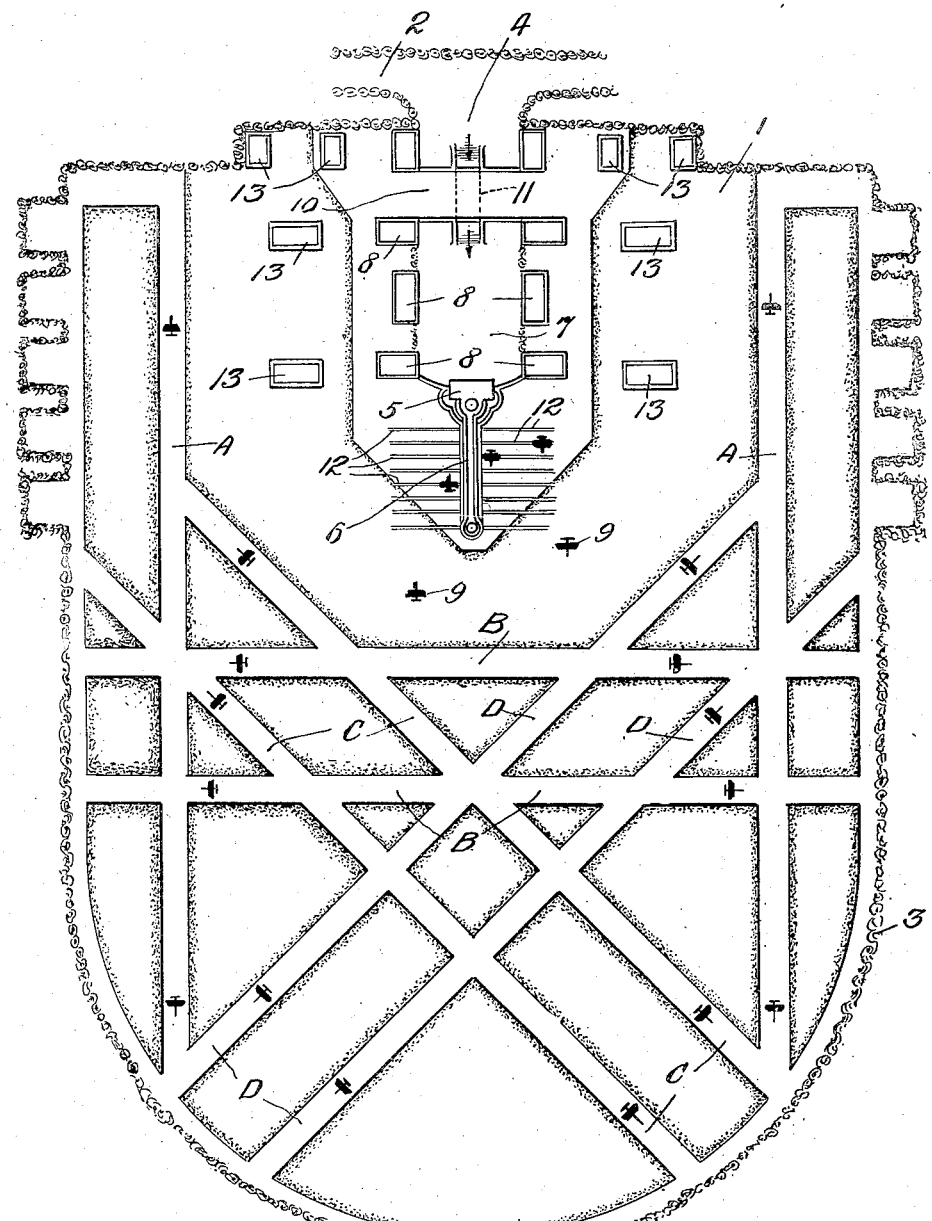
INVENTOR
John W. Wood Jr.
BY
Archibald Cox
ATTORNEY Patented Apr. 18, 1933

1,903,847

UNITED STATES PATENT OFFICE

JOHN WALTER WOOD, JR., OF NEW YORK, N. Y.

AIRPORT CONSTRUCTION

Application filed August 30, 1930. Serial No. 478,828.

This invention relates to airports, and more particularly to constructions for permitting airplanes to take-off and land, to circulate to various points, and to receive and discharge their cargoes, with maximum safety and minimum waste motion, and without unduly large ground area.

While risks in normal flying are constantly being reduced by perfection of aircraft engines, structure of the planes and improved instruments, the risks incident to operations about airports are steadily increasing owing to congestion due to increases in the number of planes. As the available land in and near the larger cities and towns is obviously limited, a serious problem confronting the industry is to provide improved airports for efficiently and economically accommodating these increases in traffic with, at the same time, a reduction in risk.

I have devised an airport construction including runways and the necessary facilities for handling planes, passengers and cargoes, which provides for circulation of planes to any desired point without interference with other planes and for a loading station which is not only centrally located with respect to the runways but also accessible to vehicular traffic.

Other objects and advantages of airports constructed in accordance with the present invention will be pointed out in connection with a preferred embodiment of the invention, reference being had to the accompanying drawing wherein: The figure is a plan view of the airport construction.

In building an airport it is, of course, necessary first to secure a plot of sufficient area to permit the construction of runways of three to four thousand feet in length. These figures, however, are merely illustrative and vary a great deal according to the type of plane operating from the airport and the surrounding terrain. Such a plot is shown at 1 in the drawing as of generally rectangular shape but with one end in the form of a semi-circle. This particular configuration is naturally not essential, and the shape of the field will vary in accordance with the land available and other considerations. The length and breadth of the field should in general be sufficient to provide for landing and taking off in at least four directions. One end of the airport will, of course, be located adjacent the roadway 2, over which vehicles may approach the airport. Preferably, the area in which the planes operate is surrounded by a fence or hedge 3, with the necessary opening therein for vehicles to enter the airport on road 4.

At some distance within the airport from its boundary adjacent the road 2, a passenger station 5 is built in such a way as to conveniently house passengers. From the station 5, there extends preferably directly out into the airport a platform 6 which is enclosed for the comfort of passengers. This platform should be a number of times the length of the ordinary planes operating from the airport. Adjacent the passenger station and between it and the end of the airport is a parking area 7 for the accommodation of vehicles carrying passengers to and from the station. Around the sides of this space may be located hangars 8 for the planes 9. Inasmuch as under ordinary conditions, it will be advisable to utilize one side of the passenger platform 6 for planes receiving passengers and the other side for planes whose passengers are disembarking, I have provided means consisting of a roadway 10 between the space for vehicles and the end of the field at which the latter approach the airport, whereby it is possible for planes leaving one side of the platform to circulate to a given point on the other side of the platform, as when on their way to hangars, without taxiing into the paths of planes which are moving to and from points of landing and taking off. The roadway 10 is intended to be a one-way road so that planes passing along it all travel in the same direction, this direction being reversed, according to which side of the platform is used for incoming and which for outgoing planes, depending on the wind on any particular day. In order to avoid collisions between planes and automobiles or other vehicles, a tunnel 11 is provided extending from a point outside of the field to the parking area 7, underneath the roadway 10. The tunnel, however, is not regarded as essential, since most of the advantages of the roadway 10 would be secured by alternately allowing planes to pass along the road 10 and vehicles to cross it. Additional hangars 13 may be provided within the airport, when needed.

In order to accommodate a maximum number of planes at a concentrated passenger station, I have provided tracks 12, which may be of narrow gauge, on which travel cars having jacks for lifting and supporting the landing gear of planes, whereby the planes may be moved sideways to points adjacent the passenger loading platform. If the plane happens not to have a wheel on the tail skid, the tail may be placed on any suitable dolly. In this way all turning of planes near embarking and disembarking platforms is eliminated and their handling greatly speeded up and the engines of planes may be shut off before the planes approach the passenger platform thus avoiding danger of injury by propellers, noise of engines, the necessity of the passengers passing through the slip stream in embarking and disembarking and the throwing of dirt on passengers and on other planes.

In making the airport, the first step is, of course, to grade the whole area by cutting and filling until the surface is substantially horizontal. Runways are then constructed of any suitable material such as macadam, brick, concrete, etc., the balance of the area being preferably surfaced with turf, except for the portion immediately surrounding the hangars and the passenger station which may best be constructed of the sort of material used in the runways. The materials used are, however, just a matter of choice, based on costs and advantages.

In order to permit planes to land and take-off, as well as to taxi to various points in the airport without interfering with one another, and without an excessive or unusual amount of taxiing, I have provided a series of runways, A, B, C and D, constructed as pairs of intersecting parallel runways in four directions with angles of about 45° between each successive pair. All the runways are of substantially the same length. Of course, the term "pair" is used in a very general sense, and it is not essential that the two runways in a pair be exact duplicates, but merely that the two together provide one runway for taking off and another for landing when the wind is from such a direction that the particular pair of runways are in use. Nor is it essential that the runways of a pair be exactly parallel, although it will be generally advantageous to have them so.

In the drawing, the runways A are shown as extending substantially the full length of the field at either side thereof while the diagonal runways C and D extend from one end of the field for distances substantially equal to the length of runways A and intersect the latter. About midway of the length of the field, there are two runways B, extending across the field and intersecting the runways A.

It will be seen that in this construction, passenger platform and hangars are centrally located with respect to the runways and yet they do not interfere with planes landing, taking off and taxiing. Moreover, the taxiing distance to and from the ends of runways is reduced to a minimum. By the use of pairs of parallel runways, those in each pair being preferably spaced, one from the other, it will be appreciated that with a given wind direction, a plane may land on one of the runways of a pair while another takes off from the other runway, using whichever runway is designated for each purpose. In general, it will be desirable to have a plane which in landing uses the runway nearer the passenger platform while the planes taking off should pass around the end of this runway and use the other one of the pair, so that planes taking off, with full load of gasoline and oil and at high speed, do not have to pass over planes taxiing to the terminal or to the hangar.

A short description of the operation of the port will aid in bringing out some of its advantages. For instance, suppose that the runways A—A run north and south and the runways B—B east and west. Then, if the wind is from the southeast, planes will land on the runway C which is the nearer one of its pair to the passenger station. The plane is then at liberty to taxi along the shortest possible route to the easterly side of the passenger loading platform in a direction facing toward the hangars and can then discharge its passengers. It then proceeds in the same direction to the roadway 10 and thence to the other side of the passenger platform, stopping, if desired, at its hangar. Having received its load of passengers or express, the plane will then proceed to the northwesterly end of the runway C which in this case is the landing runway, cross this runway and take off down the other runway C. In this way, not only does the plane not interfere with any other plane which is taking off, taxiing or landing, but it does not interfere with the loading of passengers. I have found, by constructing the airport so that the runways are mainly in one end or portion thereof and by concentrating the passenger station, loading platform, hangars and parking space centrally of the other portion, that is, within the airport instead of on an adjacent marginal area, that there are provided large, convenient areas in the latter portion of the airport and clear of the runways, so as to be available for expansion of facilities, and that there is a minimum amount of small broken-up, unusable areas in the other portion. Moreover, on account of this centralization of the passenger loading platform and hangars, the taxiing distances to and from the ends of the runways are reduced to a minimum, as well as the distances between hangars and the platform, while at the same time, the hangars and station are not only accessible to the parking area, and the latter to the roadway by which vehicles approach the airport, but the buildings do not interfere at all with planes operating on the runways.

Among the other advantages of my airport construction, the first is that no additional land is necessary over what is ordinarily employed in an airport having runways of the same length. Also, there is no increase in the cost of an airport embodying the essentials of my invention, over that involved in building any comparable airport. There is no need for planes ever to cross each other's paths. The buildings which are really located within the airport area do not interfere in any way with planes landing and taking off from the runways. There is room at the sides of the passenger station for the construction of additional hangars and other facilities. A large number of planes can receive and discharge passengers at the platform at the same time and, of course, whenever passengers are referred to herein, mail, express and freight are intended as alternatives. The size of plane accommodated is practically unlimited. Moreover, hangars are directly accessible to the central space for vehicles adjacent the passenger station and it is unnecessary for pilots and mechanics to pass through the station.

While I have described in great detail one preferred embodiment of my invention, I do not wish to be limited to these specific details of the description or otherwise save by the scope of the appended claims.

I claim:—

1. An airport construction having one boundary adjacent an approach for vehicles and including a passenger station between said boundary and the center of the field, and spaced from the latter, a roadway for planes extending generally parallel to said boundary and between it and the station, and means to permit vehicles to pass under said roadway.

2. An airport construction having an approach for vehicles adjacent one boundary thereof, a passenger station between said boundary and the center of the field, and spaced from the latter, a parking area for vehicles adjacent said station, hangars at the sides of said area, a roadway for planes between said boundary and said area, and a tunnel under said roadway, whereby vehicles may enter said space without crossing said roadway.

3. An airport having one boundary adjacent an approach for vehicles and including a passenger loading platform within said boundary, a parking area between said platform and said approach, a roadway for taxiing planes between said area and said approach, and runways mainly in the other end of the airport.

4. An airport having one boundary adjacent an approach for vehicles and including a passenger loading platform within said boundary, a parking area between said platform and said approach, hangars adjacent said parking area, a roadway for taxiing planes between said area and said approach and runways mainly in the other end of the airport.

5. An airport construction having one boundary adjacent an approach for vehicles and including a passenger loading and unloading station within said boundary and the portion of the field there adjacent, and a roadway for planes extending between said station and said boundary whereby the planes may taxi from one side of the station to the other.

6. An airport construction having one boundary adjacent an approach for vehicles, a passenger station spaced from said boundary but within the end of the airport adjacent thereto, a plurality of runways located principally in the other end of the airport, and a roadway between the station and boundary, whereby taxiing planes may pass from one side of the station to the other without traversing the paths of planes taxiing to and from the runways.

7. An airport construction having one boundary adjacent an approach for vehicles and including a passenger station between said boundary and the approximate center portion of the field, a loading platform adjacent said station and adapted to accommodate planes at either side, and a roadway for planes between said station and boundary, whereby planes may taxi from one side of said platform to the other.

8. An airport construction having one boundary adjacent an approach for vehicles and including a passenger station between said boundary and the approximate center portion of the field, a loading platform extending from said station generally toward the center of the field and adapted to accommodate planes at either side, and a roadway for planes between said station and boundary, whereby planes may taxi from one side of said platform to the other.

9. An airport construction having one boundary adjacent an approach for vehicles and including a passenger station between said boundary and the approximate center of the airport a loading platform extending from said station generally toward the center of the field, a roadway for planes between said station and boundary, and hangars at the side of the station and between the roadway and center of the field, whereby planes may taxi from one side of said platform to the other and to the hangars.

JOHN WALTER WOOD, Jr.